US011010791B1

(12) United States Patent
Mirian et al.

(10) Patent No.: US 11,010,791 B1
(45) Date of Patent: May 18, 2021

(54) SYSTEM FOR GENERATING TARGETED ADVERTISEMENT CONTENT BASED UPON INFLUENCER CONTENT AND RELATED METHODS

(71) Applicant: INMAR CLEARING, INC., Winston-Salem, NC (US)

(72) Inventors: Ali Mirian, Brooklyn, NY (US); Jacob Snelson, Fayetteville, AR (US)

(73) Assignee: INMAR CLEARING, INC., Winston-Salem, NC (US)

(*) Notice: Subject to any disclaimer, the term of this patent is extended or adjusted under 35 U.S.C. 154(b) by 332 days.

(21) Appl. No.: 15/906,671

(22) Filed: Feb. 27, 2018

(51) Int. Cl.
*G06Q 30/02* (2012.01)
*G06Q 50/00* (2012.01)

(52) U.S. Cl.
CPC ..... *G06Q 30/0255* (2013.01); *G06Q 30/0271* (2013.01); *G06Q 50/01* (2013.01)

(58) Field of Classification Search
CPC . G06Q 30/0255; G06Q 30/0271; G06Q 50/01
See application file for complete search history.

(56) References Cited

U.S. PATENT DOCUMENTS

| | | | |
|---|---|---|---|
| 8,433,611 | B2 | 4/2013 | Lax et al. |
| 10,580,045 | B1* | 3/2020 | Leal ............... G06Q 30/0273 |
| 2008/0010270 | A1 | 1/2008 | Gross |
| 2008/0046415 | A1 | 2/2008 | Henkin et al. |
| 2009/0119173 | A1 | 5/2009 | Parsons et al. |
| 2010/0125490 | A1* | 5/2010 | Kiciman ............... G06Q 30/02 705/14.1 |
| 2010/0228631 | A1 | 9/2010 | Zhang et al. |
| 2010/0306049 | A1 | 12/2010 | Kakade et al. |
| 2011/0282734 | A1* | 11/2011 | Zurada ............... G06Q 30/0251 705/14.49 |
| 2012/0022950 | A1 | 1/2012 | Gilbert et al. |
| 2012/0166274 | A1* | 6/2012 | Krishnamoorthy ......... G06Q 30/0251 705/14.49 |
| 2013/0103481 | A1* | 4/2013 | Carpenter ......... G06Q 30/0219 705/14.25 |
| 2013/0132191 | A1 | 5/2013 | Galai et al. |

(Continued)

OTHER PUBLICATIONS

"Google to Sell User' Endorsements" (Claire Cain Miller and Vindu Goel, published by the New York Times on Oct. 11, 2013) (Year: 2013).*

(Continued)

*Primary Examiner* — James M Detweiler
(74) *Attorney, Agent, or Firm* — Allen, Dyer, Doppelt + Gilchrist, P.A. Attorneys at Law (57) ABSTRACT

A targeted advertisement system may include influencer computers each associated with a respective content influencer and configured to receive respective influencer content associated with a given product for purchase. The targeted advertisement system may also include a remote server coupled to each of the influencer computers. The remote server may be configured to obtain purchaser data associated with a plurality of purchasers and generate targeted advertisement content based upon the influencer content. The remote server may also be configured to send the targeted advertisement content to respective purchaser computers of the corresponding purchasers along with an associated digital promotion and based upon the purchaser data.

21 Claims, 4 Drawing Sheets

(56) References Cited

U.S. PATENT DOCUMENTS

| | | | |
|---|---|---|---|
| 2013/0246138 A1* | 9/2013 | Johnson | G06Q 30/02 |
| | | | 705/14.16 |
| 2013/0298084 A1 | 11/2013 | Spivack et al. | |
| 2015/0073901 A1* | 3/2015 | Arnold | G06Q 30/0255 |
| | | | 705/14.53 |
| 2016/0034974 A1 | 2/2016 | Neb | |
| 2016/0048880 A1* | 2/2016 | Linden | G06F 3/0482 |
| | | | 705/14.66 |
| 2016/0140619 A1* | 5/2016 | Soni | G06Q 50/01 |
| | | | 705/14.66 |
| 2018/0032997 A1* | 2/2018 | Gordon | G06Q 30/0269 |

OTHER PUBLICATIONS

U.S. Appl. No. 15/897,551, filed Feb. 15, 2018, Snyder et al.

* cited by examiner

SYSTEM FOR GENERATING TARGETED ADVERTISEMENT CONTENT BASED UPON INFLUENCER CONTENT AND RELATED METHODS

TECHNICAL FIELD

The present invention relates to the field of electronics, and more particularly, to the processing of influencer content and related methods.

BACKGROUND

Sales of a particular product or service may be based upon how well that product or service is marketed to a consumer. One form of marketing is called influencer marketing. Influencer marketing enables a brand, for example, to connect with potential customers.

Sloggers, for example, may be considered one type of highly regarded influencer. In many instances, a consumer may trust an influencer, such as a blogger, over other types of content, for example, brand content. An influencer may address the shortcomings of brand content or a typical marketing campaign by using the influencer's media reach to educate consumers on the given product and/or provide positive feedback about the given product.

Another form of marketing is an offer, for example, a coupon or rebate, typically in paper form, for a discount toward the product or service. Some offers may be retailer specific, for example, only redeemable for the discount at a particular retailer, while other offers may be product specific from a manufacturer and redeemable at any retailer.

A coupon or rebate, for example, while typically in paper form, may be in digital form and may be referred to as a digital promotion or offer. A digital promotion may be selected or "clipped" via a mobile phone and saved to a digital wallet for redemption at a point-of-sale (POS) terminal, for example, or post-transaction. A typical coupon or rebate is applicable to a given product and has a redeemable value that may vary based upon the quantity of a given item, for example, brand of item, size of the product in terms of packaging, and/or the price point of the given item. A typical coupon or rebate may also be redeemable only at a given retailer and/or within a threshold time period.

SUMMARY

A targeted advertisement system may include a plurality of influencer computers each associated with a respective content influencer and configured to receive respective influencer content associated with a given product for purchase. The targeted advertisement system may also include a remote server coupled to each of the plurality of influencer computers. The remote server may be configured to obtain purchaser data associated with a plurality of purchasers and generate targeted advertisement content based upon the influencer content. The remote server may also be configured to send the targeted advertisement content to respective purchaser computers of the corresponding purchasers along with an associated digital promotion and based upon the purchaser data.

The influencer content may include text influencer content, and the remote server may be configured to generate the targeted advertisement to include text excerpts from the written influencer content. The influencer content may include image influencer content, for example, and the remote server may be configured to generate the targeted advertisement content to include edited image influencer content.

The remote server may be configured to send the targeted advertisement content to respective purchaser computers of the corresponding purchasers by inserting the targeted advertisement content into a social media feed associated with the respective purchaser, for example. The digital promotion may be applicable toward the purchase of the given product for purchase. The digital promotion may be applicable toward another product other than the given product for purchase, for example.

The respective influencer content may include a blog post. The purchaser data may include social media data, for example. The purchaser data may include historical purchase data. The purchaser data may include retailer loyalty program data. The purchaser data may include basket level data, for example.

A method aspect is directed to a method of sending targeted advertisement content in a targeted advertisement system that includes a plurality of influencer computers each associated with a respective content influencer and configured to receive respective influencer content associated with a given product for purchase. The method may include using a remote server coupled to each of the plurality of influencer computers and to obtain purchaser data associated with a plurality of purchasers and generate targeted advertisement content based upon the influencer content. The remote server may also be used to send the targeted advertisement content to respective purchaser computers of the corresponding purchasers along with an associated digital promotion and based upon the purchaser data.

A computer readable medium aspect is directed to a non-transitory computer readable medium for sending targeted advertisement content in a targeted advertisement system that includes a plurality of influencer computers each associated with a respective content influencer and configured to receive respective influencer content associated with a given product for purchase. The non-transitory computer readable medium may include computer executable instructions that when executed by a processor of a remote server coupled to each of the plurality of influencer computers to perform operations. The operations may include obtaining purchaser data associated with a plurality of purchasers and generating targeted advertisement content based upon the influencer content. The operations may also include sending the targeted advertisement content to respective purchaser computers of the corresponding purchasers along with an associated digital promotion and based upon the purchaser data.

DETAILED DESCRIPTION

The present invention will now be described more fully hereinafter with reference to the accompanying drawings, in which preferred embodiments of the invention are shown.

This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
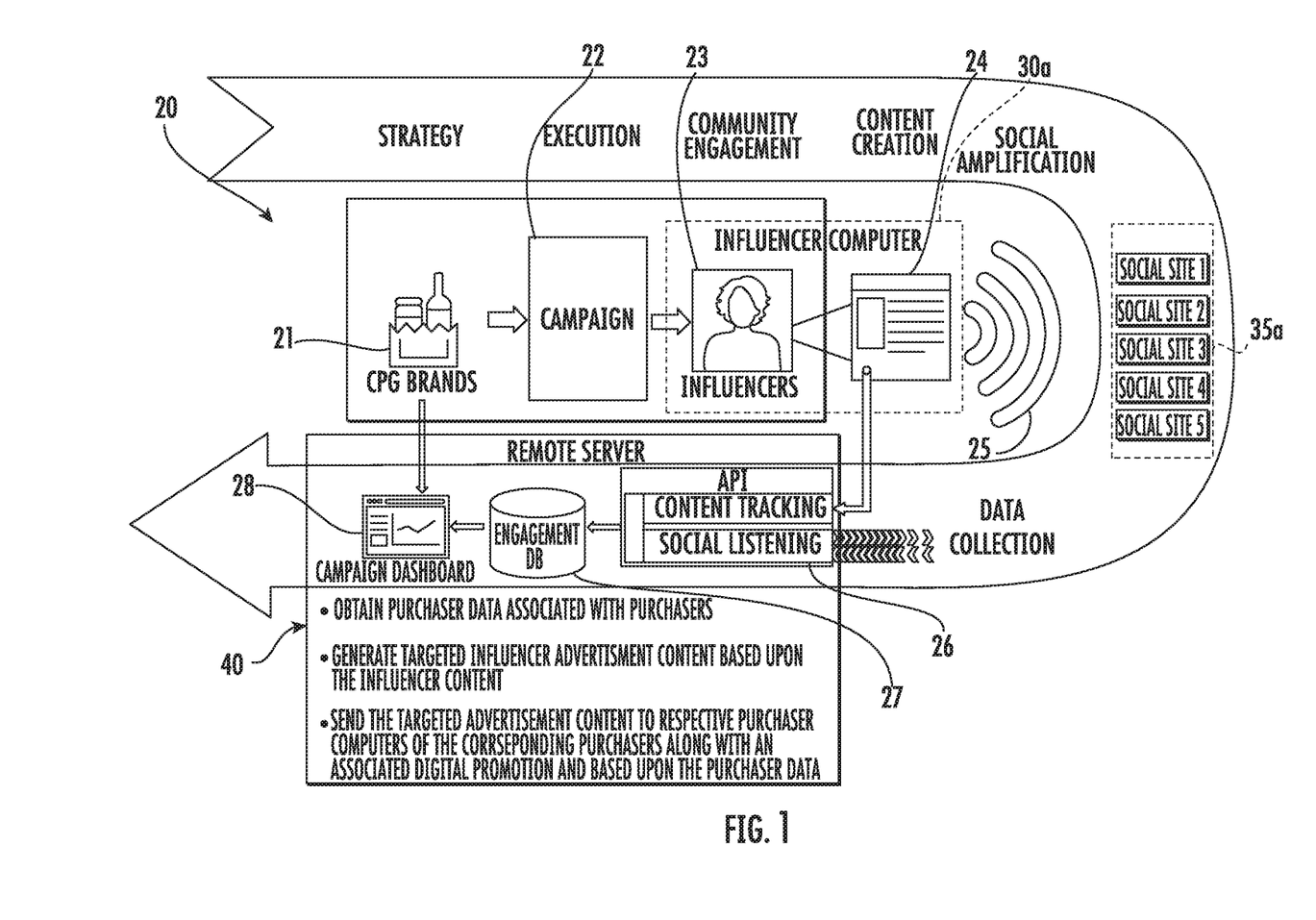
FIG. 1 is a schematic diagram of a system according to an embodiment.

Referring initially to FIG. 1, a targeted advertisement system 20 may be particularly advantageous for influencing a purchaser. Such a system 20 may be implemented in various stages, each of which will be described. A first stage, strategy to pursue an advertising campaign, involves an advertiser or brand 21, such as, for example, for a consumer package goods (CPG) brand. The CPG brand 21 executes an advertising campaign 22 in an execution stage. The campaign 22 may include one or more content influencers 23 which are chosen based on certain elements in a community engagement stage. Further details of the how content influencers 23 are chosen will be described in further detail below.

In a content creation stage, the influencer creates targeted influencer content 24. In a social amplification stage 25, the targeted influencer content 24 is sent to users (e.g., purchaser computers 35a) and shared, for example, by email, social media, etc. A remote server 40 may collect data in a data collection stage, which may provide an application programming interface (API) 26 for content tracking and social listening. Collected data may be stored in an engagement database 27 of the remote server 40. A campaign dashboard 28 may be provided, for example, to the CPG brand 21 to gauge effectiveness of the advertising campaign 22. Further details of the system 20 including the remote server 40 will be described below.

Figure 2:
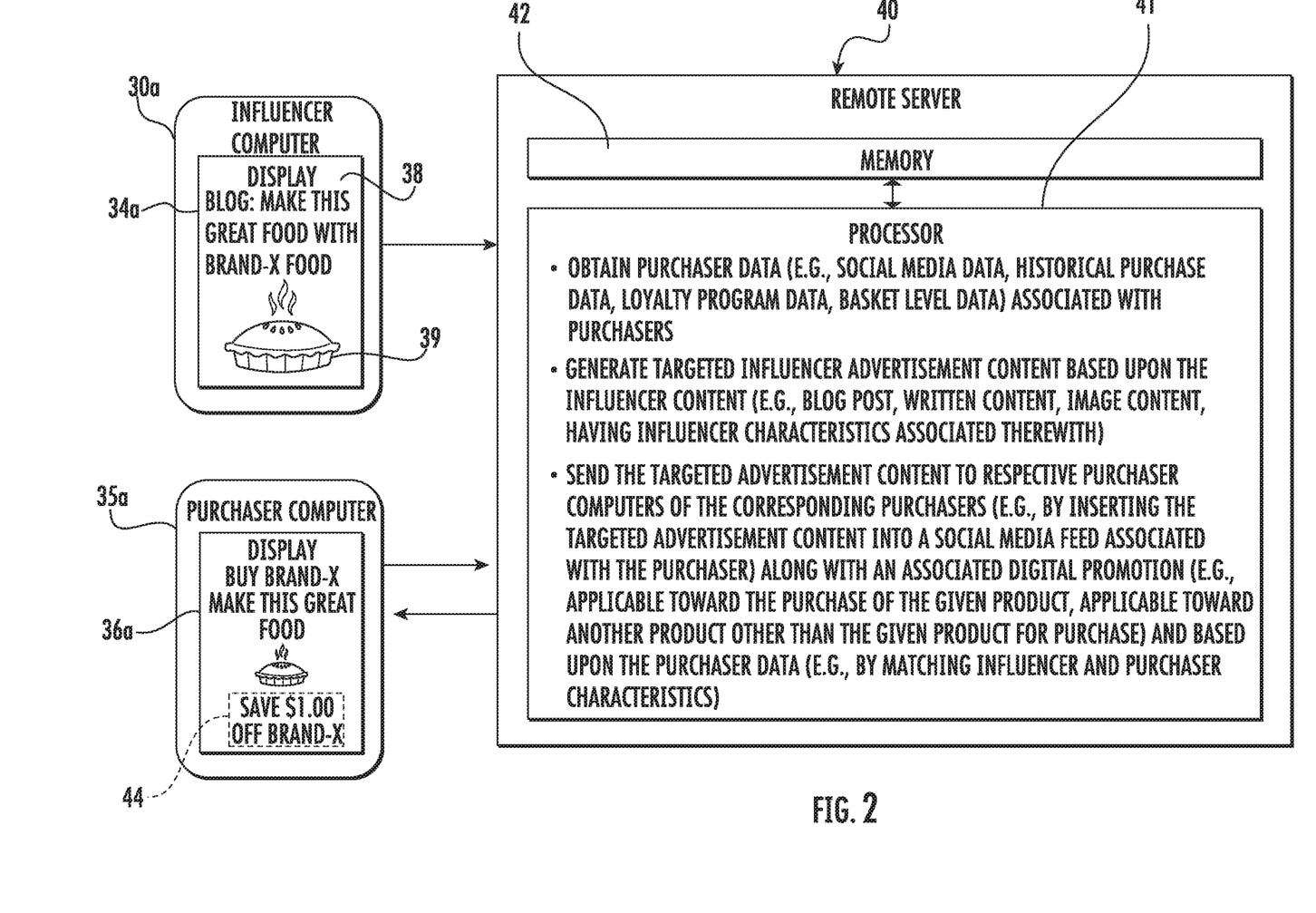
FIG. 2 is a more detailed schematic diagram of the system of FIG. 1.
Figure 3:
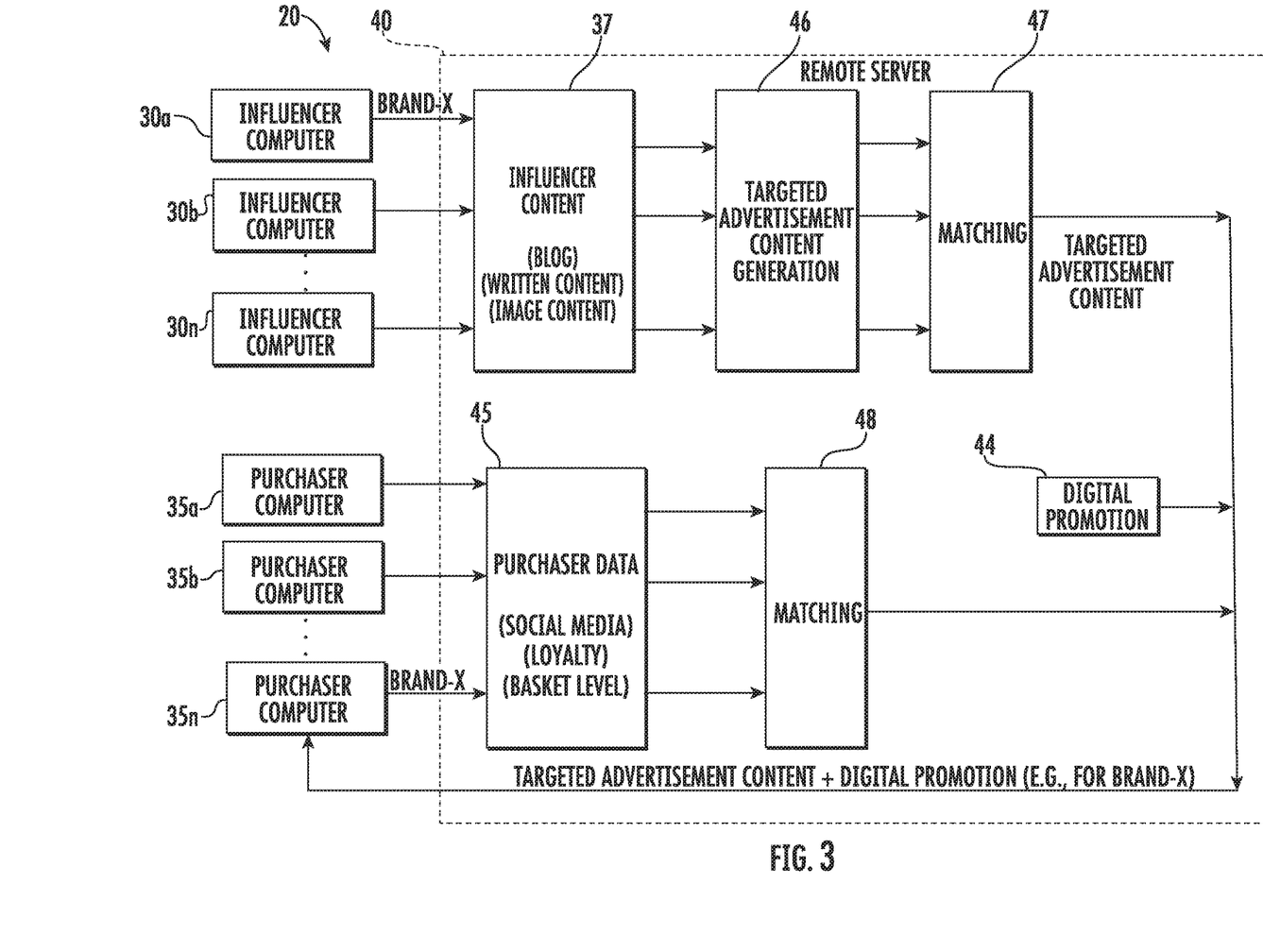
FIG. 3 is a schematic diagram of the system of FIG. 2 illustrating its operation.

Referring additionally to FIGS. 2 and 3, the system 20 illustratively includes influencer computers 30a-30n. Each influencer computer 30a-30n includes a memory, a processor coupled to the memory, and an input device, such as, for example, a virtual or physical keyboard. Each influencer computer may also include a display 34a coupled to the processor as will be appreciated by those skilled in the art, an influencer computer 30a-30n may be any of a personal computer (PC), tablet computer, and a smartphone. Of course, each influencer computer 30a-30n may be another type of computer and may each be a different type.

Each influencer computer 30a-30n is associated with respective influencer content 37 and configured to receive respective influencer content associated with a given product for purchase. As will be appreciated by those skilled in the art, an influencer is termed as such because an influencer typically has a relatively large following and the ability to influence their followers through their content (i.e., influencer content 37). For example, a relatively strong influencer may be an advocate for the given product for purchase, and that influencer may be more influential to potential buyers of the given product as compared to a static advertisement.

An influencer may be a blogger, for example, and provide blog posts as the influencer content 37. The influencer content 37 may also include written influencer content 38 and image influencer content 39 and have certain influencer characteristics associated therewith. Exemplary influencer characteristics may include the type of influencer content 37 (blog, article, email, social media post, etc.), the content type (e.g., recipe, how-to, etc.), and/or the type of product for purchase associated with the influencer content (e.g., food, household item). The influencer characteristics may include other and/or additional characteristics.

In one example, the influencer may be a food blogger and may provide a recipe that uses a Brand-X ingredient. A photo of the finished product and/or the Brand-X ingredient may be provided along with the recipe (FIG. 2). In other examples, the influencer content 37 may be or include a tutorial using the given product for purchase and/or an article about a related item or service to the given product for purchase. Of course, the influencer content 37 may be other and/or additional types of content, for example, social media posts, etc.

The remote server 40 is coupled to each of the influencer computers 30a-30n, for example, over a communications network, such as, the Internet. The remote server 40 includes a processor 41 and a memory 42 coupled to the processor. While functions of the remote server 40 are described herein, it should be appreciated by those skilled in the art that the functions are performed through cooperation of the processor 41 and memory 42.

Figure 4:
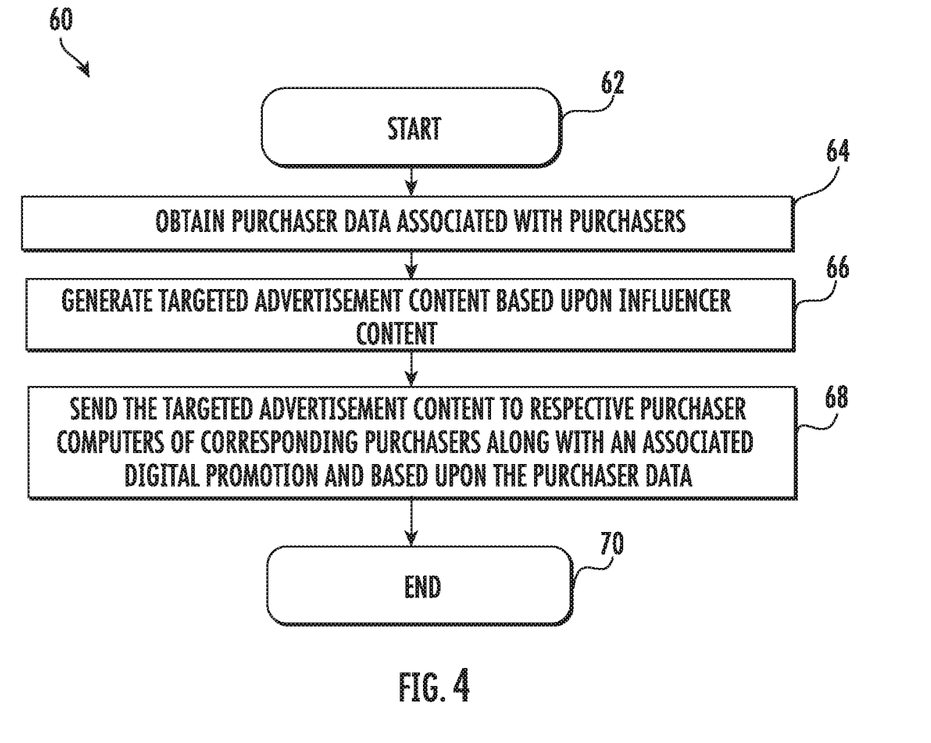
FIG. 4 is a flow chart illustrating operation of the remote server of FIG. 3.

Referring now additionally to the flowchart 60 in FIG. 4, beginning at Block 62, operation of the system 20 with respect to the remote server 40 will now be described. At Block 64, the remote server 40 obtains purchaser data 45 associated with purchasers. The purchaser data 45 may include any of social media data, historical purchase data, retailer loyalty program data, and basket level data, for example. The purchaser data 45 may be other and/or additional types of data. For example, the remote server 40 may mine one or more of the purchaser computers 35a-35n associated with the purchaser (e.g., for documents, photos, etc.) along with purchaser data 45 stored in the cloud (e.g., retailer loyalty program, social media feeds, etc.). In one example, the remote server 40 may mine purchaser data 45, for example, interests and/or hobbies of the purchaser, from social media feeds. Alternatively or additionally, the remote server 40 may map email addresses with corresponding purchasers. The remote server 40 may use the purchaser's email address to access one or more loyalty programs, for example, associated with a retailer. The remote server 40 may communicate with another server that may be hosting the corresponding loyalty program. However, the corresponding loyalty program may be hosted by or on the remote server 40.

By having loyalty program data, the remote server 40 may obtain demographic information associated with the purchaser, for example, geographic location, name, date of birth, gender, etc. Additionally, upon access to the corresponding loyalty program, the remote server 40 may obtain historical purchase data of the purchaser (e.g., whether they have previously purchased Brand-X products, how much, and how often). Similarly, the remote server 40 may obtain data as to what products are currently being checked out at the retailer (i.e., in a current transaction). For example, the remote server 40 may obtain data indicative that the purchaser is purchasing, currently (e.g., in real time), Brand-X products. This type of data is typically referred to as basket level data. The collected or obtained purchaser data is used by the remote server 40 to define purchaser characteristics, for example, as noted above, interests and hobbies and/or brand preferences, etc.

At Block 66, the remote server 40 generates targeted advertisement content 46 (FIG. 3) based upon the influencer content 37. For example, where the influencer content includes text influencer content 38, the remote server 40 generates the targeted advertisement to include text excerpts from the written influencer content. The remote server 40 may change or edit the text excerpts, for example, font style and/or font size. Of course, the remote server 40 may further edit the text excerpts.

Where the influencer content includes image influencer content 39, the remote server 40 generates the targeted advertisement content 46 to include edited image influencer content. For example, the remote server 40 may resize, recolor, and/or crop the image influencer color. Of course, the remote server 40 may perform other editing operations on the image influencer content.

With respect to the food blogger example, above, the remote server 40 may parse the food blog including the recipe and photo of the finished product and/or the Brand-X ingredient. The remote server 40 may generate the targeted advertisement content 46 to include the recipe and a resized photo of the finished product. The remote server 40 may change the font and/or add a tagline to the targeted advertisement, such as, for example, "Enjoy Brand-X Products."

Before ending at Block 70, at Block 68, the remote server 40 sends the targeted advertisement content 46 to respective purchaser computers 35a-35n of the corresponding purchasers along with an associated digital promotion 44 and based upon the purchaser data. Each purchaser computer 35a-35n includes a memory, a processor coupled to the memory, and an input device, such as, for example, a virtual or physical keyboard. Each purchaser computer may also include a display 36a coupled to the processor. As will be appreciated by those skilled in the art, a purchaser computer 35a-35n may be any of a personal computer (PC), tablet computer, and a smartphone. Of course, each purchaser computer 35a-35n may be another type of computer and may each be a different type.

The remote server 40 may send the targeted advertisement content 46 and associated digital promotion to the respective purchaser computers of the corresponding purchasers based upon matching the influencer and purchaser characteristics 47,48 (FIG. 3). For example, in the food blogger example, above, where the influencer has published a recipe with the Brand-X ingredient, and a given purchaser has previously purchased and regularly purchases Brand-X products and mentions Brand-X products on social media (e.g., "likes"), the remote server 40 may send the targeted advertisement content 46 and associated digital promotion to that purchaser. In other words, the targeted advertisement content 46 and associated digital promotion 44 are targeted to certain purchasers.

The targeted advertisement content 46 and associated digital promotion 44 may be sent to respective purchasers either directly (e.g., by email, embedding in social media feed, etc.) or indirectly (e.g., by embedded hyperlink in an email or social media feed). In some embodiments, the remote server 40 may send the targeted advertisement content 46 to respective purchaser computers 35a-35n of the corresponding purchasers by inserting the targeted advertisement content into a social media feed associated with the purchaser. For example, the targeted advertisement content 46 along with the associated digital promotion 44 may be inserted into a news feed of a social media feed associated with the purchaser or integrated within a social media feed that may be shared. Thus, the digital promotion 44 and targeted advertisement content 46 may be shared among social media users.

More particularly, in the food blogger example, respective purchasers may receive the targeted advertisement, which includes the recipe including the Brand-X ingredient along with a digital promotion 44. The digital promotion 44 may be, for example, applicable toward the purchase of the given product for purchase, in this case a Brand-X product. In some embodiments, the digital promotion 44 may be for another product other than the given product for purchase, for example, a competitor's product. The digital promotion 44 may be a digital coupon, a digital rebate, and/or another type of digital promotion that may be redeemed for value and according to the terms of the digital promotion.

As will be appreciated by those skilled in the art, while the example described herein relates to a single generated targeted advertisement and associated digital promotion 44 generated from a single influencer computer 30a, the system 20 includes multiple influencer computers 30a-30n with respective influencer content 37, which may be different and from which multiple targeted advertisements or advertisement data may be generated. Of course, in some embodiments, a given purchaser may receive multiple targeted advertisement content 46 (e.g., from multiple influencers with different influencer content which may or may not be associated with the same given product for purchase). In other embodiments, a given influencer's content may be used as a basis for generating respective targeted advertisements to be sent to more than one purchaser.

By generating targeted advertisement content 46 and sending the targeted advertisement content along with an associated digital promotion 44 based upon purchaser data, the system 20 advantageously addresses the technical problem of connecting disparate data sources (e.g., an advertisement from a blog post (influencer) with a purchaser (purchaser) and with an associated digital promotion (manufacturer and/or retailer). Manufacturers and/or retailers of food products, for example, typically rely on coupons published in print or electronically and send coupons to many prospective purchasers without regard for personal or shopper preferences. Coupons alone may not be enough to persuade a purchaser to purchase given products. However, by obtaining and using purchaser data 45 and using the purchaser data as a basis for sending targeted advertisement content, a manufacturer and/or retailer, for example, may be able to increase the conversion or redemption rate of the accompanying digital promotion 44 (and thus product purchases).

In other words, the system 20 acquires, manipulates, and matches information in a way that generally cannot be acquired through conventional techniques or methods. In particular, the system 20 captures consumer preferences and matches them to advertisements generated from content, which is used as a vehicle to deliver a digital promotion 44. Indeed, consumer preference data may be relatively valuable for analytics, targeting, and shopper engagement.

A method aspect is directed to a method of sending targeted advertisement content 46 in a system 20 that includes influencer computers 30a-30n each associated with a respective content influencer and configured to receive respective influencer content 37 associated with a given product for purchase. The method includes using a remote server 40 coupled to each of the influencer computers 30a-30n to obtain purchaser data 45 associated with purchasers and generate targeted advertisement content 46 based upon the influencer content 37. The remote server 40 is also used to send the targeted advertisement content to respective purchaser computers 35a-35n of the corresponding purchasers along with an associated digital promotion 44 and based upon the purchaser data 45.

A computer readable medium aspect is directed to a non-transitory computer readable medium for sending targeted advertisement content 46 in a system 20 that includes influencer computers 30a-30n each associated with a respective content influencer and configured to receive respective influencer content 37 associated with a given product for purchase. The non-transitory computer readable medium includes computer executable instructions that when executed by a processor 41 of a remote server 40 coupled to each of the influencer computers 30a-30n performs operations. The operations include obtaining purchaser data 45 associated with purchasers and generating targeted advertisement content 46 based upon the influencer content 37. The operations may also include sending the targeted advertisement content 46 to respective purchaser computers 35a-35n of the corresponding purchasers along with an associated digital promotion 44 and based upon the purchaser data 45.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A targeted advertisement system comprising:
a plurality of influencer computers each associated with a respective content influencer and configured to receive respective influencer content associated with a given product for purchase and comprising at least image influencer content, the given product for purchase being associated with a given brand; and
a remote server coupled to each of the plurality of influencer computers and configured to perform operations, the operations comprising:
obtaining purchaser data associated with a plurality of purchasers by at least:
obtaining a respective unique purchaser identifier associated with each of the plurality of purchasers;
accessing a respective loyalty program associated with each of the plurality of purchasers using at least the unique identifiers;
obtaining respective historical purchase data associated with each of the plurality of purchasers from the loyalty program;
determining purchasers from among the plurality of purchasers that have purchased a product of the given brand based upon their respective historical purchase data;
obtaining respective social media data associated with each of the plurality of purchasers; and
determining purchasers from among the plurality of purchasers that have mentioned the given brand on social media based upon their respective social media data;
performing editing operations on the image influencer content to create edited image influencer content;
generating targeted advertisement content that includes at least a portion of the influencer content, wherein the generated targeted advertisement includes the edited image influencer content;
generating a digital coupon for the given brand based upon the targeted advertisement content,
matching the purchaser data and the influencer content to identify targeted purchasers from among the plurality of purchasers, the targeted purchasers comprising the purchasers from among the plurality thereof determined to have purchased a product of the given brand and determined to have mentioned the given brand on social media; and
sending the targeted advertisement content to respective purchaser computers of the targeted purchasers by inserting the targeted advertisement content into a social media feed associated with the respective targeted purchaser and embedding a hyperlink to the digital coupon within the social media feed, wherein the hyperlink is configured to cause the respective purchaser computer to display the digital coupon thereon upon selection.

2. The targeted advertisement system of claim 1 wherein the influencer content comprises text influencer content; and wherein the remote server is configured to generate the targeted advertisement to include text excerpts from the written influencer content.

3. The targeted advertisement system of claim 1 wherein the digital coupon is applicable toward the purchase of the given product for purchase.

4. The targeted advertisement system of claim 1 wherein the digital coupon is applicable toward another product of the given brand other than the given product for purchase.

5. The targeted advertisement system of claim 1 wherein the respective influencer content comprises a blog post.

6. The targeted advertisement system of claim 1 wherein the operation of obtaining the purchaser data associated with a plurality of purchasers further comprises,
obtaining basket level data indicative of products each of the respective purchasers is currently purchasing upon accessing the loyalty program.

7. The targeted advertisement system of claim 6 wherein the operations further comprise,
determining respective purchasers that are currently purchasing a product associated with the given brand based upon the basket level data; and
wherein matching the purchaser data and the influencer content to identify targeted purchasers further comprises identifying purchasers of the plurality thereof determined to be currently purchasing a product associated with the given brand.

8. A remote server for a targeted advertisement system comprising a plurality of influencer computers each associated with a respective content influencer and configured to receive respective influencer content associated with a given product for purchase and comprising at least image influencer content, the given product for purchase being associated with a given brand, the remote server coupled to each of the plurality of influencer computers and comprising:
a memory; and
a processor coupled to the memory and configured to perform operations, the operations comprising:
obtaining purchaser data associated with a plurality of purchasers by at least:
obtaining a respective unique purchaser identifier associated with each of the plurality of purchasers;
accessing a respective loyalty program associated with each of the plurality of purchasers using at least the unique identifiers;
obtaining respective historical purchase data associated with each of the plurality of purchasers from the loyalty program;
determining purchasers from among the plurality of purchasers that have purchased a product of the given brand based upon their respective historical purchase data;
obtaining respective social media data associated with each of the plurality of purchasers; and determining purchasers from among the plurality of purchasers that have mentioned the given brand on social media based upon their respective social media data;

performing editing operations on the image influencer content to create edited image influencer content;

generating targeted advertisement content that includes at least a portion of the influencer content, wherein the generated targeted advertisement includes the edited image influencer content;

generating a digital coupon for the given brand based upon the targeted advertisement content, matching the purchaser data and the influencer content to identify targeted purchasers from among the plurality of purchasers, the targeted purchasers comprising the purchasers from among the plurality thereof determined to have purchased a product of the given brand and determined to have mentioned the given brand on social media; and sending the targeted advertisement content to respective purchaser computers of the targeted purchasers by inserting the targeted advertisement content into a social media feed associated with the respective targeted purchaser and embedding a hyperlink to the digital coupon within the social media feed, wherein the hyperlink is configured to cause the respective purchaser computer to display the digital coupon thereon upon selection.

9. The remote server of claim 8 wherein the influencer content comprises text influencer content; and wherein the processor is configured to generate the targeted advertisement to include text excerpts from the written influencer content.

10. The remote server of claim 8 wherein the respective influencer content comprises a blog post.

11. The remote server of claim 8 wherein the operation of obtaining the purchaser data associated with a plurality of purchasers further comprises, obtaining basket level data indicative of products each of the respective purchasers is currently purchasing upon accessing the loyalty program.

12. The remote server of claim 11 wherein the operations further comprise, determining respective purchasers that are currently purchasing a product associated with the given brand based upon the basket level data; and wherein matching the purchaser data and the influencer content to identify targeted purchasers further comprises identifying purchasers of the plurality thereof determined to be currently purchasing a product associated with the given brand.

13. A method of sending targeted advertisement content in a targeted advertisement system comprising a plurality of influencer computers each associated with a respective content influencer and configured to receive respective influencer content associated with a given product for purchase and comprising at least image influencer content, the given product for purchase being associated with a given brand, the method comprising:

obtaining, using a remote server coupled to each of the plurality of influencer computers, purchaser data associated with a plurality of purchasers by at least:

obtaining a respective unique purchaser identifier associated with each of the plurality of purchasers;

accessing a respective loyalty program associated with each of the plurality of purchasers using at least the unique identifiers;

obtaining respective historical purchase data associated with each of the plurality of purchasers from the loyalty program;

determining purchasers from among the plurality of purchasers that have purchased a product of the given brand based upon their respective historical purchase data;

obtaining respective social media data associated with each of the plurality of purchasers; and determining purchasers from among the plurality of purchasers that have mentioned the given brand on social media based upon their respective social media data;

performing, using the remote server, editing operations on the image influencer content to create edited image influencer content;

generating, using the remote server, targeted advertisement content that includes at least a portion of the influencer content, wherein the generated targeted advertisement includes the edited image influencer content;

generating, using the remote server, a digital coupon for the given brand based upon the targeted advertisement content, matching, using the remote server, the purchaser data and the influencer content to identify targeted purchasers from among the plurality of purchasers, the targeted purchasers comprising the purchasers from among the plurality thereof determined to have purchased a product of the given brand and determined to have mentioned the given brand on social media; and sending, using the remote server, the targeted advertisement content to respective purchaser computers of the targeted purchasers by inserting the targeted advertisement content into a social media feed associated with the respective targeted purchaser and embedding a hyperlink to the digital coupon within the social media feed, wherein the hyperlink is configured to cause the respective purchaser computer to display the digital coupon thereon upon selection.

14. The method of claim 13 wherein the influencer content comprises text influencer content; and wherein the method further comprises using the remote server to generate the targeted advertisement to include text excerpts from the written influencer content.

15. The method of claim 13 wherein obtaining the purchaser data associated with a plurality of purchasers further comprises, obtaining basket level data indicative of products each of the respective purchasers is currently purchasing upon accessing the loyalty program.

16. The method of claim 15 further comprising, determining respective purchasers that are currently purchasing a product associated with the given brand based upon the basket level data; and wherein matching the purchaser data and the influencer content to identify targeted purchasers further comprises identifying purchasers of the plurality thereof determined to be currently purchasing a product associated with the given brand.

17. A non-transitory computer readable medium for sending targeted advertisement content in a targeted advertisement system comprising a plurality of influencer computers each associated with a respective content influencer and configured to receive respective influencer content associated with a given product for purchase and comprising at least image influencer content, the given product for purchase being associated with a given brand, the non-transitory computer readable medium comprising computer executable instructions that when executed by a processor of a remote server coupled to each of the plurality of influencer computers cause the processor to perform operations comprising:

obtaining purchaser data associated with a plurality of purchasers by at least:

obtaining a respective unique purchaser identifier associated with each of the plurality of purchasers;

accessing a respective loyalty program associated with each of the plurality of purchasers using at least the unique identifiers;

obtaining respective historical purchase data associated with each of the plurality of purchasers from the loyalty program;

determining purchasers from among the plurality of purchasers that have purchased a product of the given brand based upon their respective historical purchase data;

obtaining respective social media data associated with each of the plurality of purchasers; and         determining purchasers from among the plurality of purchasers that have mentioned the given brand on social media based upon their respective social media data;

performing editing operations on the image influencer content to create edited image influencer content;

generating targeted advertisement content that includes at least a portion of the influencer content, wherein the generated targeted advertisement includes the edited image influencer content;

generating a digital coupon for the given brand based upon the targeted advertisement content,     matching the purchaser data and the influencer content to identify targeted purchasers from among the plurality of purchasers, the targeted purchasers comprising the purchasers from among the plurality thereof determined to have purchased a product of the given brand and determined to have mentioned the given brand on social media; and     sending the targeted advertisement content to respective purchaser computers of the targeted purchasers by inserting the targeted advertisement content into a social media feed associated with the respective targeted purchaser and embedding a hyperlink to the digital coupon within the social media feed, wherein the hyperlink is configured to cause the respective purchaser computer to display the digital coupon thereon upon selection.

18. The non-transitory computer readable medium of claim 17 wherein the influencer content comprises text influencer content; and wherein the operations comprise generating the targeted advertisement to include text excerpts from the written influencer content.

19. The non-transitory computer readable medium of claim 17 wherein the respective influencer content comprises a blog post.

20. The non-transitory computer readable medium of claim 17 wherein the operation of obtaining the purchaser data associated with a plurality of purchasers further comprises,     obtaining basket level data indicative of products each of the respective purchasers is currently purchasing upon accessing the loyalty program.

21. The non-transitory computer readable medium of claim 20 wherein the operations further comprise,     determining respective purchasers that are currently purchasing a product associated with the given brand based upon the basket level data; and     wherein matching the purchaser data and the influencer content to identify targeted purchasers further comprises identifying purchasers of the plurality thereof determined to be currently purchasing a product associated with the given brand.

* * * * *